(No Model.)

R. A. WADE.
SHADE FOR HANDLES OF BICYCLES.

No. 582,447. Patented May 11, 1897.

WITNESSES

INVENTOR
Richard A. Wade.
BY Edgar Tate & Co
ATTORNEYS

UNITED STATES PATENT OFFICE.

RICHARD A. WADE, OF BROOKLYN, NEW YORK.

SHADE FOR HANDLES OF BICYCLES.

SPECIFICATION forming part of Letters Patent No. 582,447, dated May 11, 1897.

Application filed August 15, 1896. Serial No. 602,899. (No model.)

*To all whom it may concern:*

Be it known that I, RICHARD A. WADE, a citizen of the United States, and a resident of Brooklyn, in the county of Kings and State of New York, have invented certain new and useful Improvements in Shades for the Handles of Bicycles and Similar Vehicles, of which the following is a specification, reference being had to the accompanying drawings, forming a part thereof, in which similar numerals of reference indicate corresponding parts wherever found in both views.

This invention relates to shades or shields for the handles of bicycles; and the object thereof is to provide an improved device of this class which is simple in construction and operation, and which is designed to be detachably connected with the handle-bar adjacent to the handle or handles, so as to cover and protect the same from the rays of the sun.

The invention is fully disclosed in the following specification, of which the accompanying drawings form a part, in which—

Figure 1:
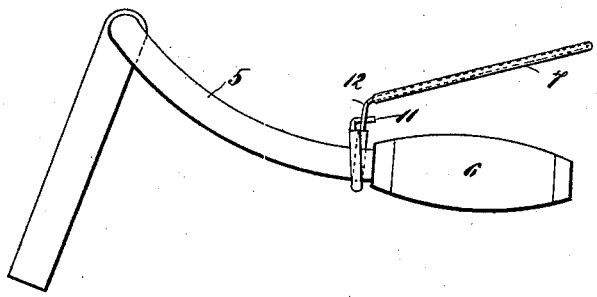
Figure 2:
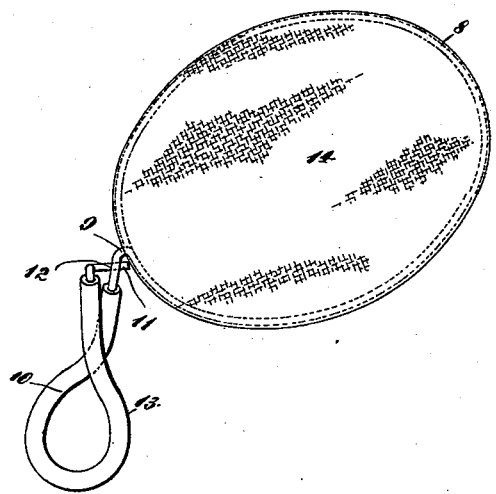

Figure 1 is a side view of the handle-bar of a bicycle or similar vehicle, showing my improved shade or shield connected therewith; and Fig. 2, a perspective view of the shade or shield detached.

In the drawings forming a part of this specification I have shown at 5 the handle-bar of a bicycle or similar vehicle and at 6 one of the handles, and in the practice of my invention I provide a shade or shield 7, which is adapted to be detachably connected with the handle-bar 5, so as to cover or protect the handles.

This shade or shield is preferably composed of a wire frame having a covering of leather, cloth, or similar material, and in practice I select a suitable wire, which is bent into a circular or elliptical form, as shown at 8, and one end thereof is bent outwardly and the other end curved around the loop thus formed, as shown at 9, and the longer end, which is bent outwardly, is formed into a loop 10, and the end thereof is provided with a hook 11, which is adapted to engage with the shank of said loop, as shown at 12. The loop 10 is provided with a rubber tube or covering 13, and the circular or elliptical frame is provided with a covering 14, of cloth, leather, or any suitable fabric, which is placed thereover and secured thereto in any desired manner.

The shade or shield is connected with the handle-bar by passing the loop 10 around the same, as shown in Fig. 1, and then securing the ends of the loop together, as shown in Fig. 2, and it will be understood that the shade or shield is of such size as to fully cover the handle and to protect the hands, and the object of the rubber covering or tubing 13 is to provide means whereby the wire loop will securely grasp and hold the handle, so as to retain the shade or shield in proper position.

This device is simple in construction and operation and perfectly adapted to accomplish the result for which it is intended, and it will be understood that my improved shade or shield may be used whenever desired—for instance, during the daytime, when the sun is shining, or it may be detached when not required to protect the hand from the rays of the sun.

Having fully described my invention, I claim as new and desire to secure by Letters Patent—

The herein-described shade or shield for the handles of bicycles, consisting of a wire frame provided with a suitable cover, and to which is attached a wire support, which is bent to form a loop one extremity of said loop being connected with said frame, and the other being provided with a hook adapted to engage with said loop, said loop being also provided with a rubber covering, whereby the shield may be detachably connected with the handle-bar and projected therefrom, in the manner and for the purpose set forth.

In testimony that I claim the foregoing as my invention I have signed my name, in presence of the subscribing witnesses, this 13th day of August, 1896.

RICHARD A. WADE.

Witnesses:
 W. W. HILL,
 CHARLES S. ROGERS.